United States Patent [19]
Bertoncelli et al.

[11] Patent Number: 5,967,870
[45] Date of Patent: Oct. 19, 1999

[54] SEMI-FINISHED COMPOSITE MATERIAL FOR THE MANUFACTURE OF BUOYANCY PRODUCTS AND RELATED PRODUCTS

[75] Inventors: Milena Bertoncelli, S. Cesario sul Panaro; Adriano Vignudelli, Spilamberto, both of Italy

[73] Assignee: Tex Proget S.R.L., Modena, Italy

[21] Appl. No.: 08/532,594

[22] PCT Filed: Mar. 31, 1994

[86] PCT No.: PCT/EP94/01042

§ 371 Date: Jan. 26, 1996

§ 102(e) Date: Jan. 26, 1996

[87] PCT Pub. No.: WO94/22712

PCT Pub. Date: Oct. 13, 1994

[30] Foreign Application Priority Data

Apr. 1, 1993 [IT] Italy .............................. MO93A0046

[51] Int. Cl.[6] .......................................................... B63C 9/08
[52] U.S. Cl. ........................................... 441/107; 428/137
[58] Field of Search .................................... 441/102–108, 441/111–120; 428/102, 137, 138

[56] References Cited

U.S. PATENT DOCUMENTS

| | | |
|---|---|---|
| 1,754,342 | 4/1930 | Tubiolo .................................... 441/112 |
| 3,199,128 | 8/1965 | Nojd . |
| 3,805,308 | 4/1974 | Hirsch . |
| 4,137,586 | 2/1979 | Evert ....................................... 441/107 |
| 4,281,428 | 8/1981 | Rochlin . |
| 4,416,641 | 11/1983 | Spinoza et al. .......................... 441/107 |
| 4,555,234 | 11/1985 | Kent ........................................ 441/106 |
| 4,934,973 | 6/1990 | Taylor ..................................... 441/117 |
| 5,267,519 | 12/1993 | Uglene et al. ........................... 112/440 |

FOREIGN PATENT DOCUMENTS

| | | |
|---|---|---|
| 3048902 | 7/1982 | Germany . |
| 9207143 | 9/1992 | Germany . |

*Primary Examiner*—Jesus D. Sotelo
*Attorney, Agent, or Firm*—Reising, Ethington, Barnard & Perry, PLLC

[57] ABSTRACT

A semi-finished composite material for the manufacture of buoyancy products and related products. The semi-finished composite material includes a plurality of layer of elastic and flexible waterproof material with a specific gravity substantially less than that of water, fastening means adaptable for associating the layers to each other so as to form a plurality of air filled spaces by consecutive ones of the fastening means between adjacent layers, wherein the fastening means of a plurality of quiltings spaced from each other so as to form the air filled spaces with the plurality of layers including the air spaces adapted to being further insertable between a lining and a coating.

26 Claims, 19 Drawing Sheets

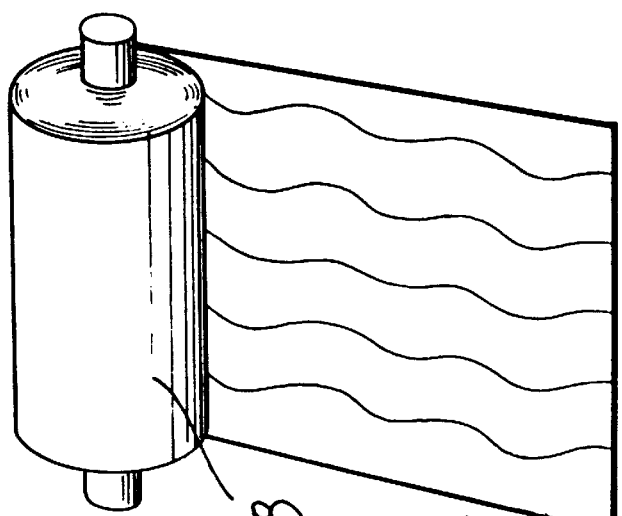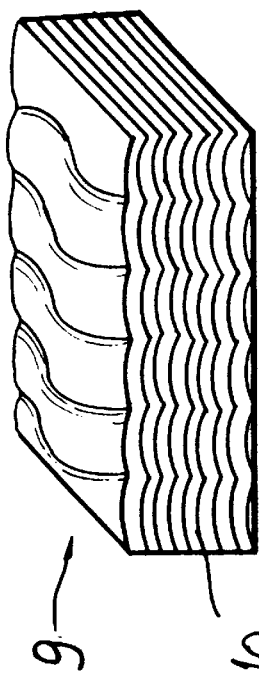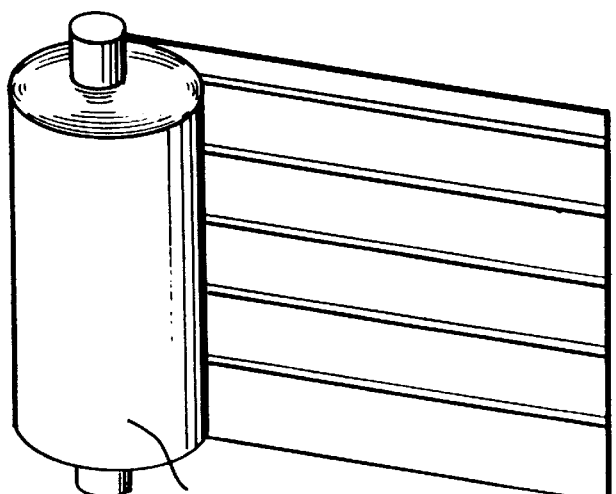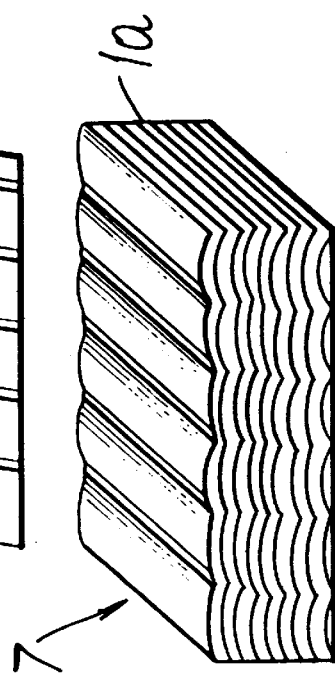

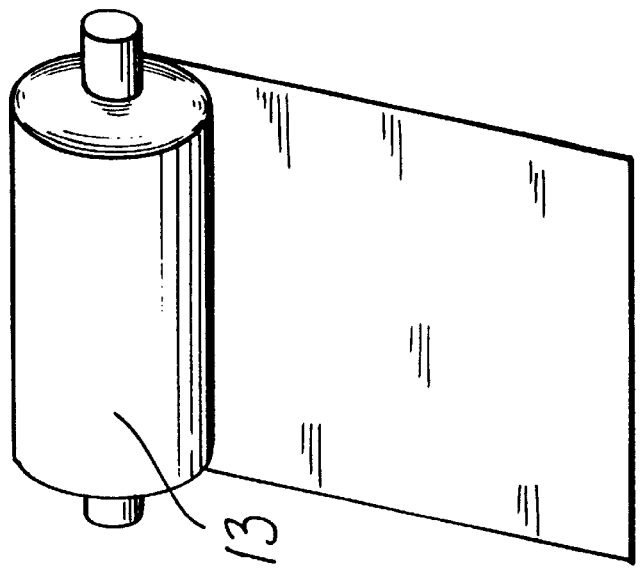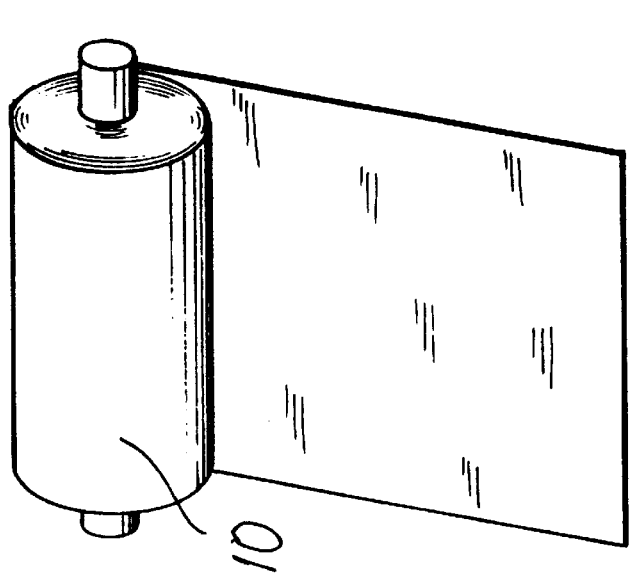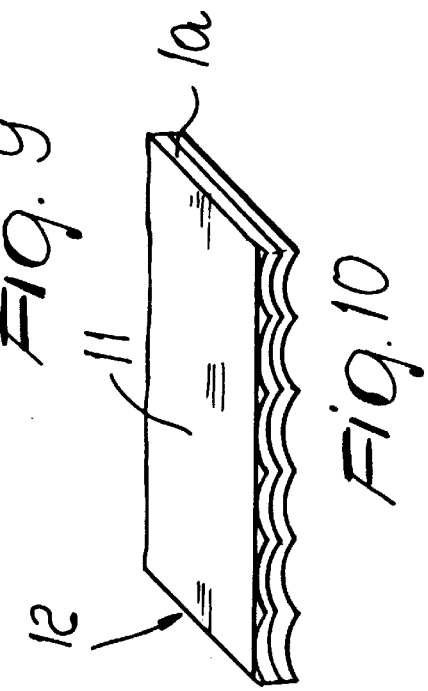

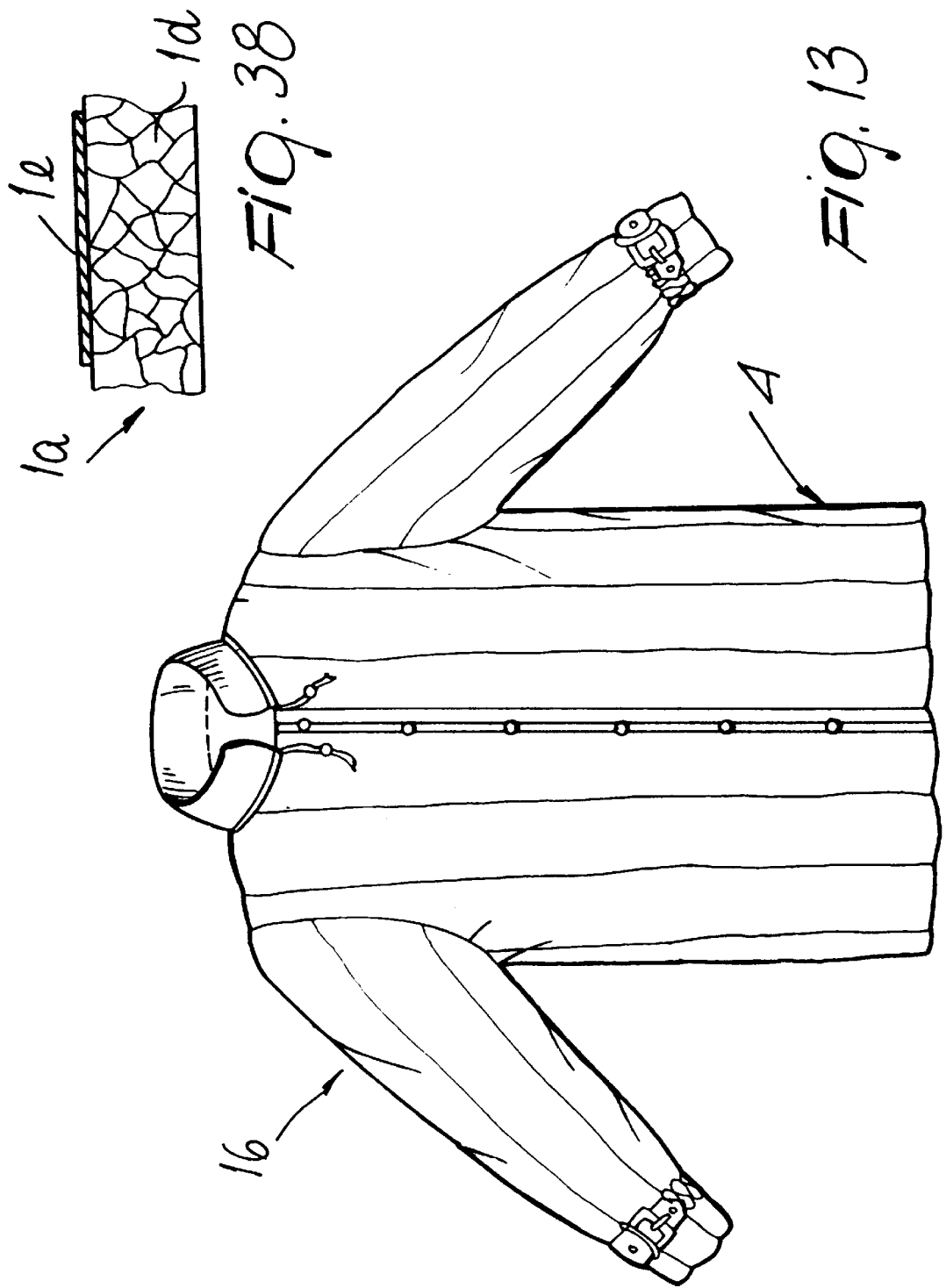

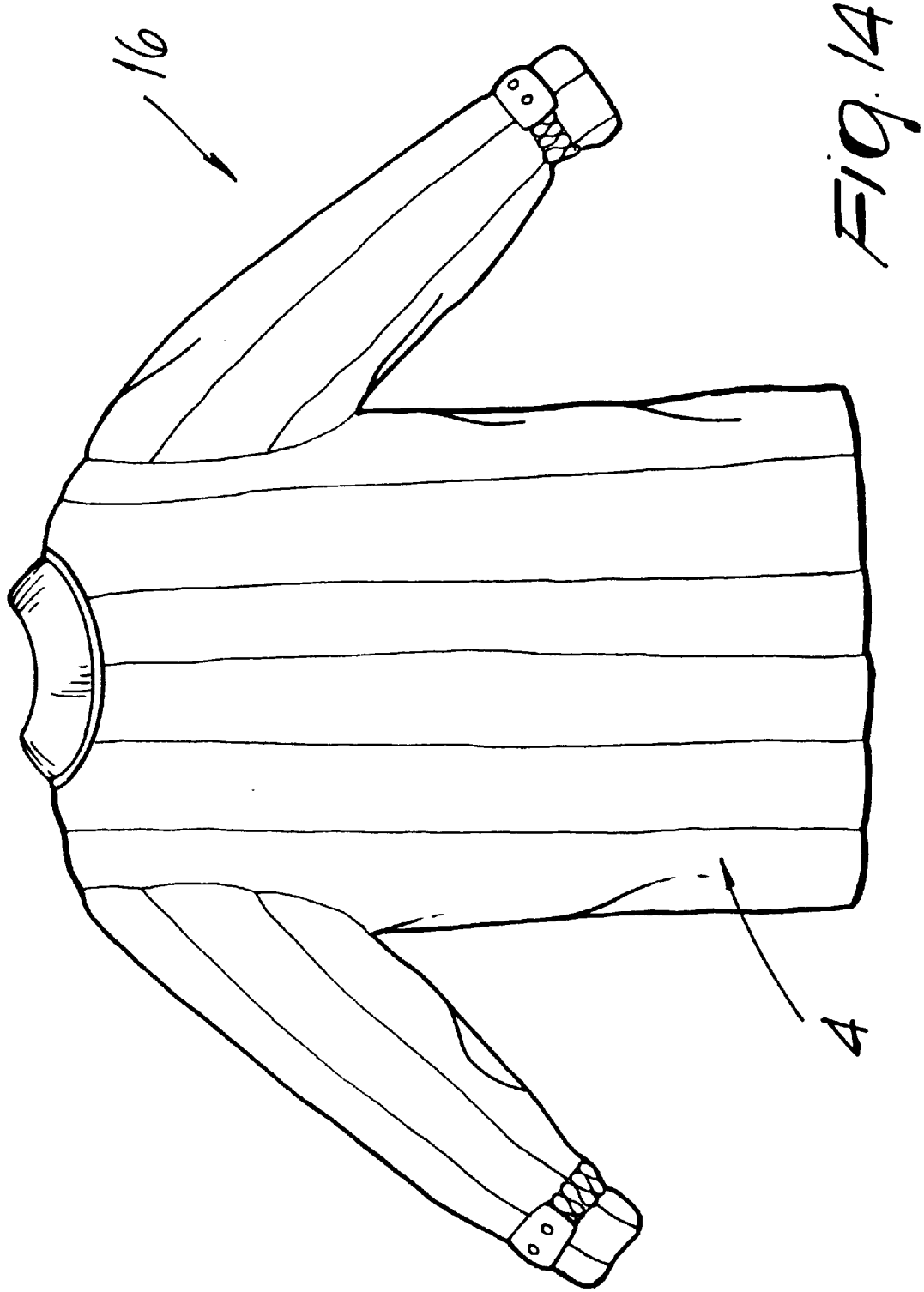

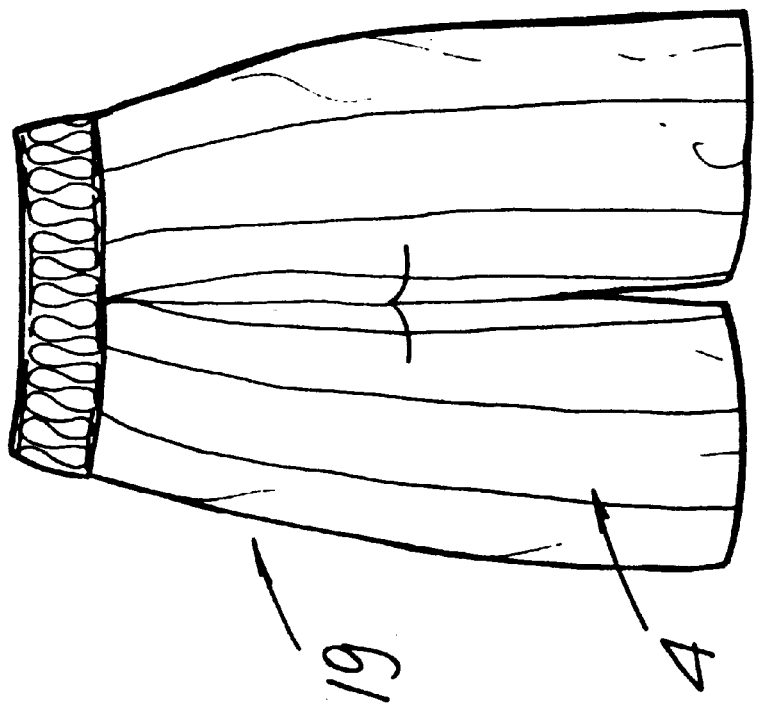
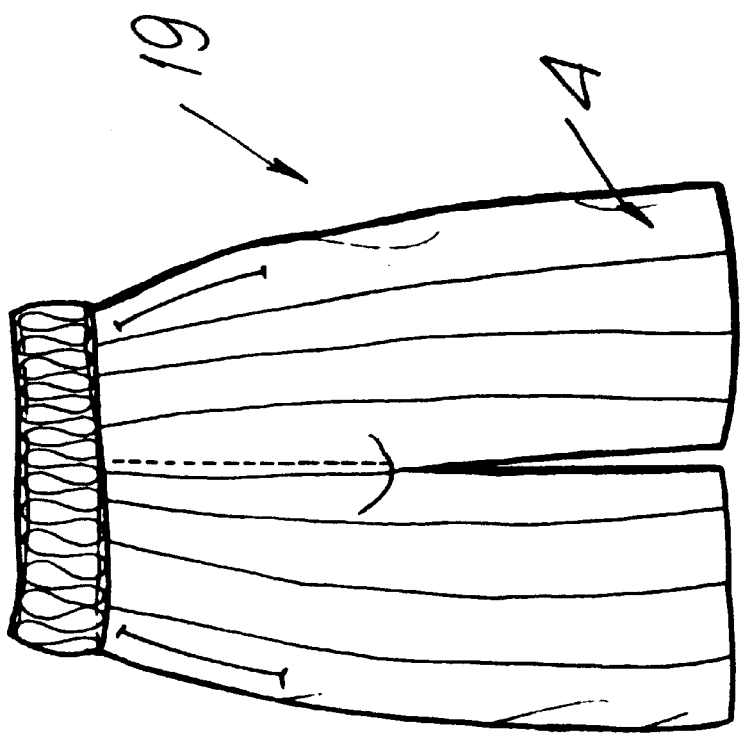

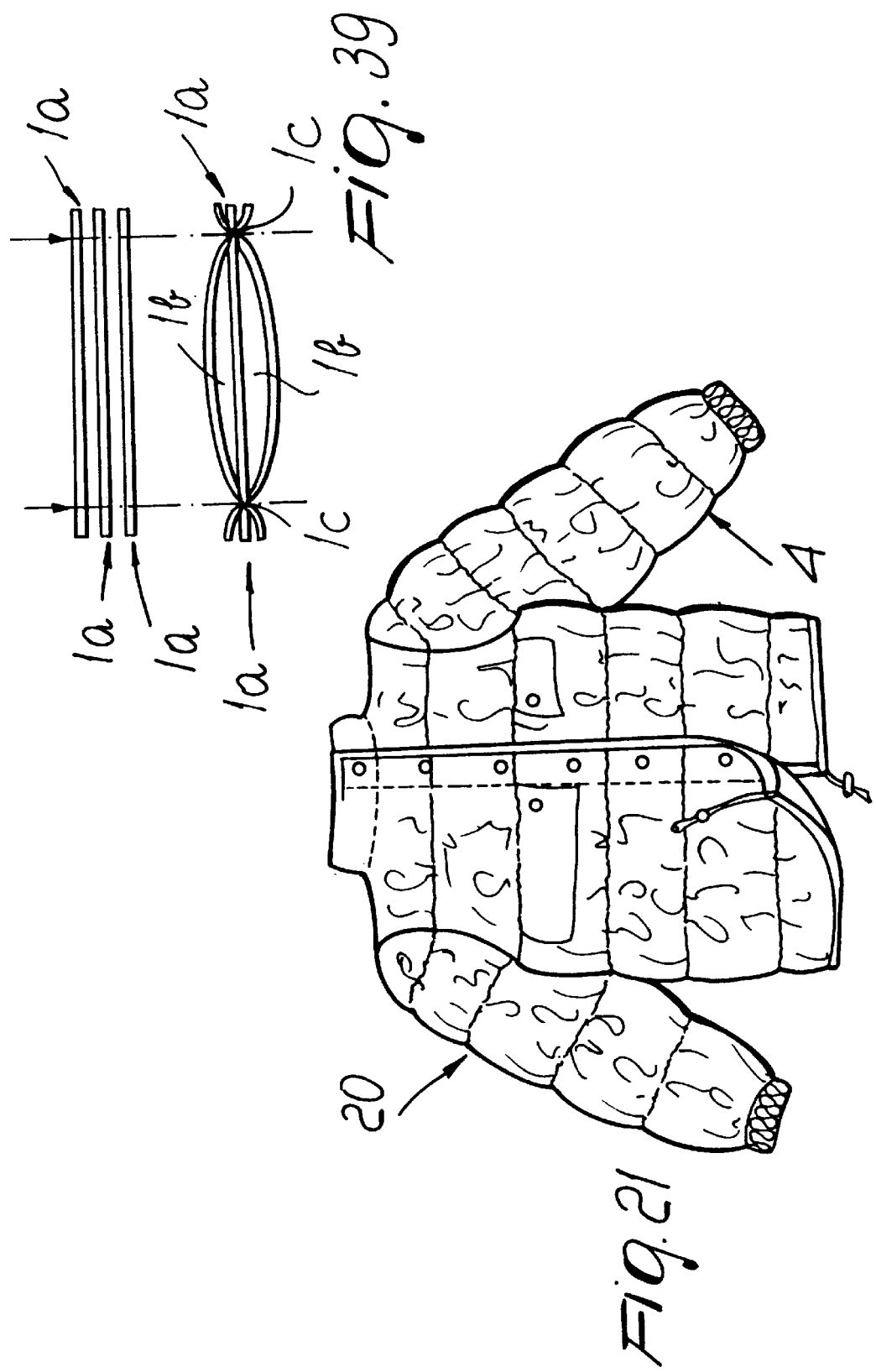

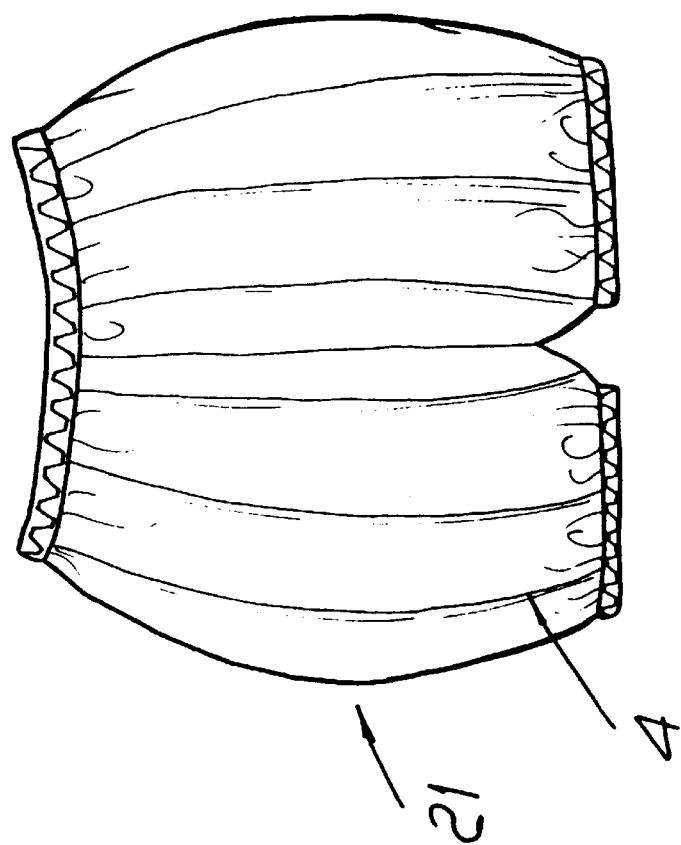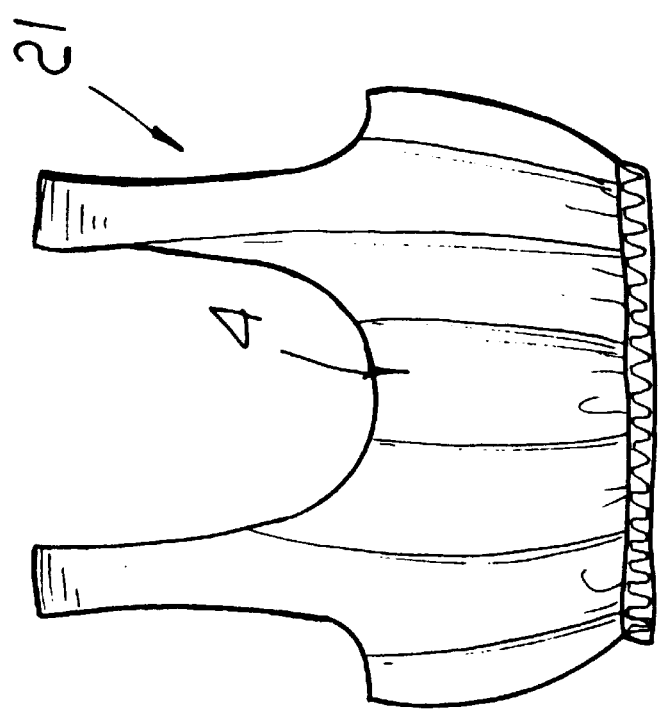

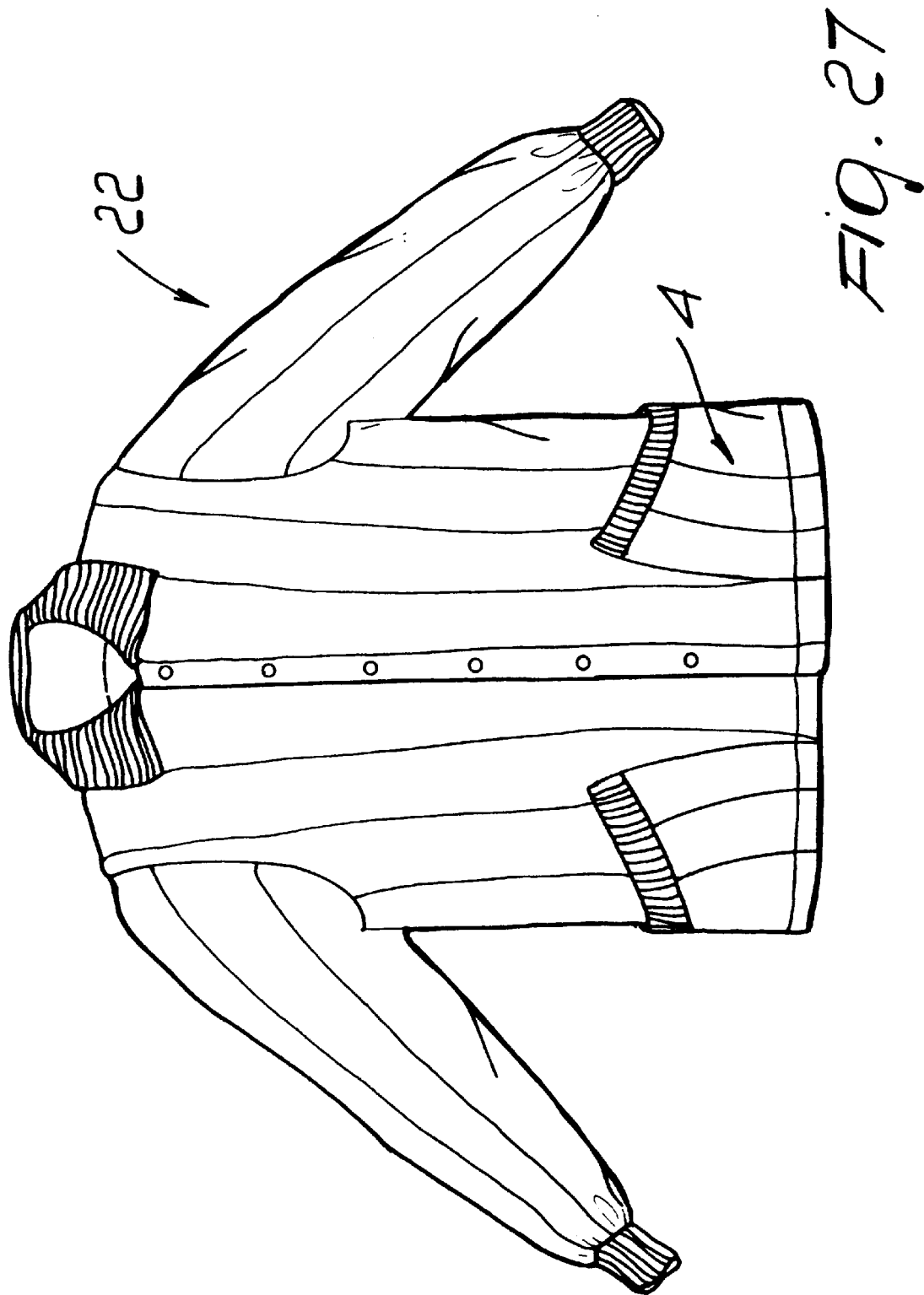

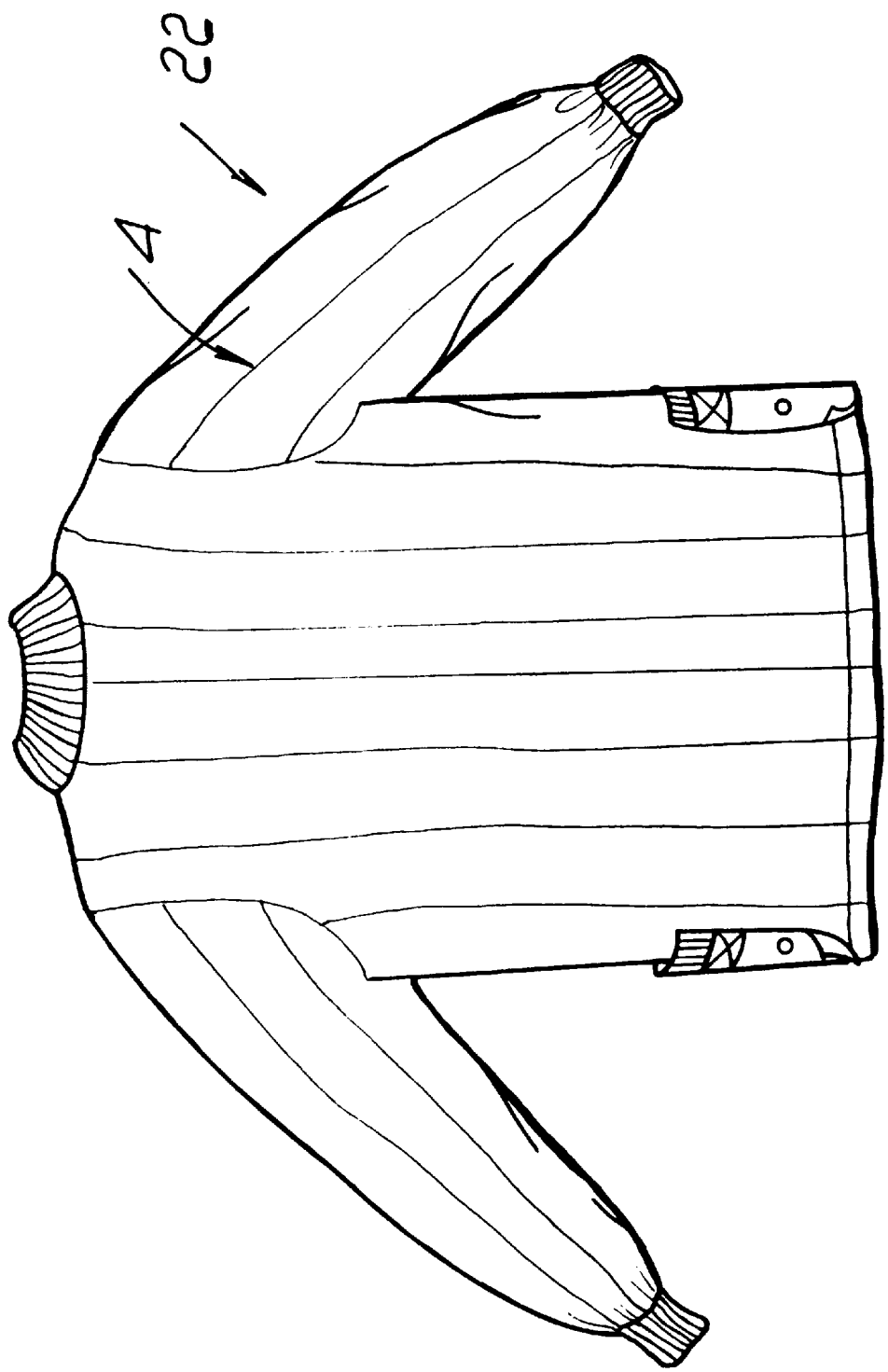

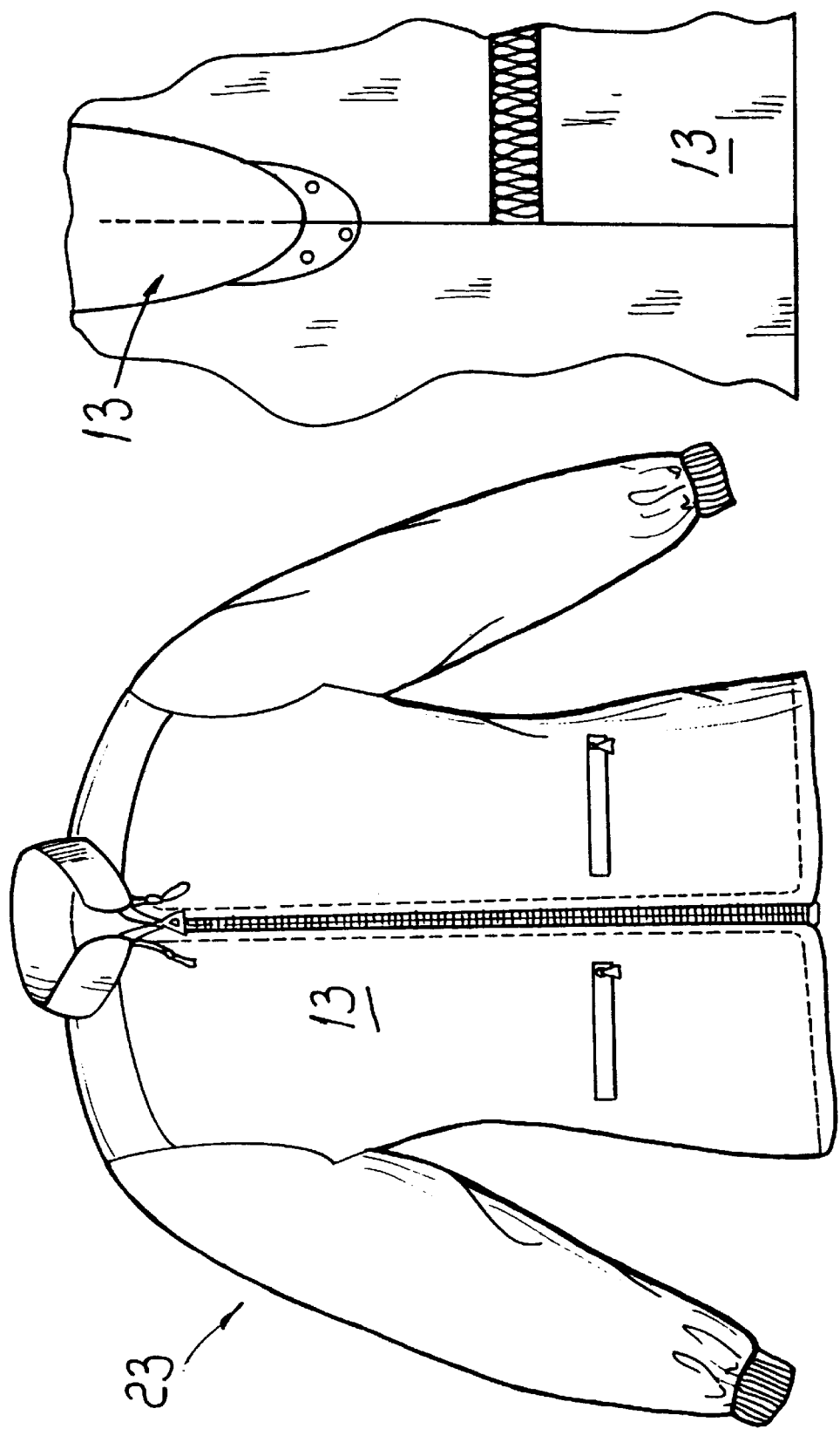

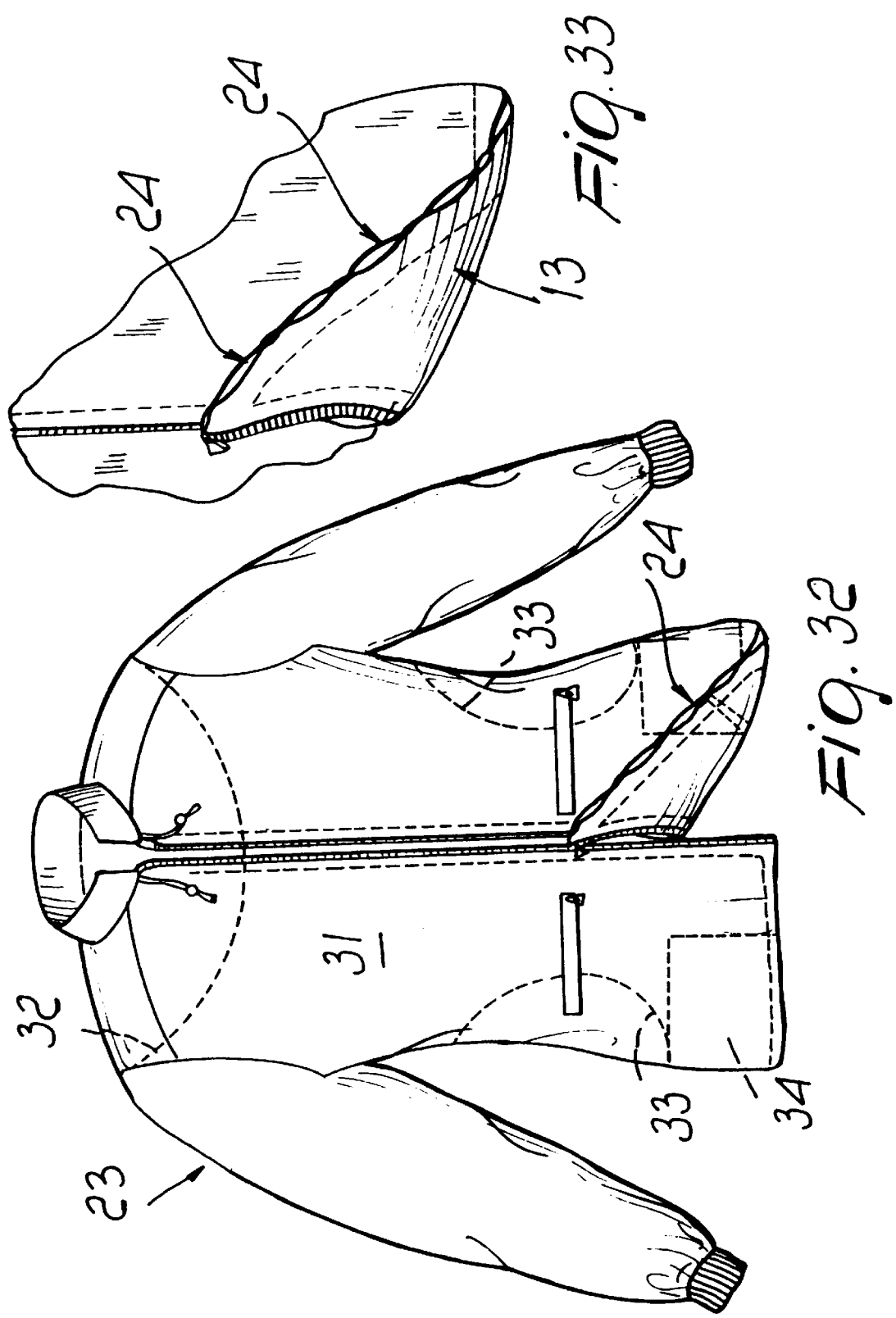

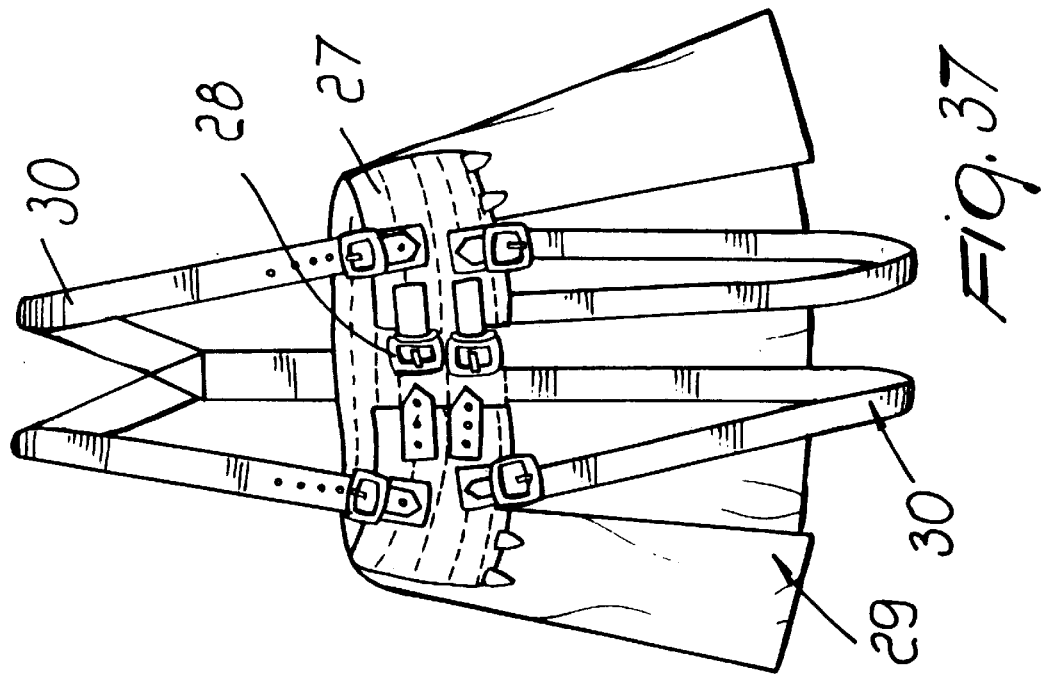
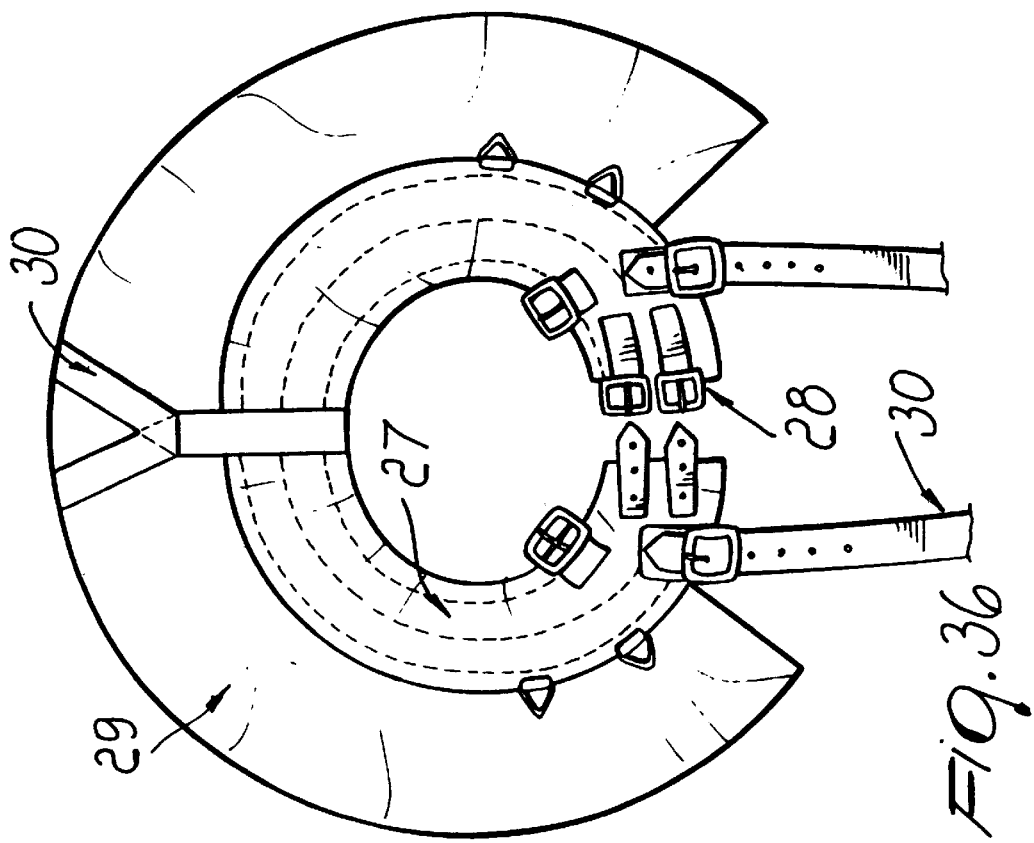

SEMI-FINISHED COMPOSITE MATERIAL FOR THE MANUFACTURE OF BUOYANCY PRODUCTS AND RELATED PRODUCTS

The invention concerns a semi-finished composite material for the manufacture of buoyancy products and related products, that is an article, advantageously pre-made of layers of lightweight, waterproof material joined together to make up a garment which ensures the buoyancy in water of the person wearing it.

The prior art involves life jackets, generally sleeveless, made from pads of expanded polystyrene, or other lightweight material, inserted in a lining attached to the body of the jacket: life jackets of this kind are generally known from "British Plastics" August 1966, pages 448–451 (Plastics foams for increased buoyancy); the prior art involves also jackets in inflatable plastic material.

The life jacket is seen as a piece of equipment to be put on only in the case of imminent danger, it being stiff, as in the case of the padded jacket, constrictive and unhealthy, as in the case of the inflatable jacket, since it impedes transpiration and confines the body of the person; the garment, therefore, is not one that may be used for purposes other than that of keeping afloat the person in the moment of need, that is, as an item of clothing or accessory: its life-saving function, furthermore, depends entirely on its availability in the case of danger, a somewhat remote availability in every day life in places made dangerous by the presence of stretches of water.

Such a jacket is bulky, uncomfortable to wear, in practice stiffened by the pads of material suitable for ensuring buoyancy of the persons, and unaesthetic; above all they are costly and constitute a specific investment of money; this being sufficient for them not to be considered for purchase by the general public, with the consequent serious safety risk for persons who fall in the water, particularly for those who are inexpert or hampered.

DE-U-9 207 143 discloses buoyancy clothes made up with semi-finished composite material comprising a plurality of layers of waterproof material with a specific gravity substantially less than that of water, said plurality of layers being elastic, flexible and being insertable between a lining and a cover sheet, said layers being associated to each other by means of fastening means, specifically disclosed as stitches. However, such clothes only allow a buoyancy effect by relying on air cells formed into the thickness of each layer due to the expanded structure of the substance by which each layer is made.

Such prior art may be subject to considerable improvements with a view to eliminating the drawbacks outlined above.

From the foregoing emerges the need to resolve the technical problem of finding a semi-finished composite material, suitable for the manufacture of buoyancy clothes and/or buoyancy items in general, capable of increased buoyancy properties.

A particular aspect of the technical problem consists in finding a life jacket which is, instead, a soft garment, or at least, elastic or flexible enough to be worn normally, particularly in places in which people, particularly if they are inexpert swimmers, or, at the time, incapable of swimming, are frequently exposed to the danger of drowning; such as, for example, at the seaside, in lakes, in rivers, in canals and also near swimming pools or waterways in general; the garment should be, for example, useful for trippers, cruise passengers, fishermen in boats or in water and also for sailors; it should also be useful while bathing children, handicapped people and people in general, above all if they are inexpert swimmers.

The invention resolves the said technical problem by adopting an article, in particular a garment, made from a semi-finished composite, in rolls or also in pieces, comprising the incorporation of a waterproof material with a specific gravity substantially less than that of water, said plurality of layers being elastic, flexible and being insertable between a lining and a cover sheet, said layers being associated to each other by means of fastening means, characterised in that, said fastening means consist of a plurality of quiltings spaced from each other so that a pair of consecutive quiltings defines air spaces between each layer and the adjacent layer or layers.

The plurality of layers can form padding, joined to at least one lining, internal or external, said lining being waterproof or not, even made of cloth.

The joining of layer to layer being such that air spaces are defined between superimposed layers, forming a pack of layers; this can be advantageously achieved by means of quilting along continuous lines forming a pattern which can be freely defined; also the joining between single-layer or multilayer (pack) pieces and lining, or linings, may be achieved by quilting.

Said quilting being preferably obtained by means of a plurality of sewings, preferably spaced from each other at such a distance to define a plurality of air-spaces capable of improving buoyancy; the distance preferably being of at least 7 cm, approximately.

In the case of at least two linings, the pack can also be inserted as in a bag; in the case of at least two linings, particularly if at laest one is not waterproof, the bottom part of them should be equipped with outlets for water, advantageously achieved by having the lower border with sewn lengths alternating with unsewn lengths.

It is also possible to manufacture and use such pieces made up by one or more layers, each formed by a tight combination of one layer of the material specified above with a sheet of a different and much thinner material, so as to obtain a less soft padding, suitable for the manufacture of garments with specific, for example military, uses.

The waterproof material forming each layer having an absolute gravity essentially less than that of water, and being elastic and flexible, can advantageously be expanded polyethylene, or expanded polyurethane, or expanded PVC.

Satisfactory results were obtained by using for example, a type of polyethylene marketed in the last ten years or so by POLIPAV PE DI. BI—Spa of Ghiardo di Bibbiano (RE) as a soundproofing material laid under floors in sheets 4 mm thick, to deaden the sound of footsteps.

To increase softness, the thickness of each layer should advantageously be up to about 2 mm, preferably between 1,2 to 1,5 mm. The density of such material forming the layers being about 28 kg/m$^3$.

Furthermore it is also foreseen, for less flexible, harder padding, the use of a type of layer made up of close fitting, i.e. glued, sheet of expanded polyethylene about 2 mm thick.

The layer of expanded polyethylene can be joined together with a sheet of waterproof material capable of improving mechanical properties of each layer, such as PVC, or unexpanded polyethylene, preferably laminated, such as cartene (Trade Name of a product classified as nylon), a few hundredths of a millimeter thick.

The semi-finished composite can also be used by inserting into a waterproof lining to form small mattresses, armbands, belts and floating rings in place of the usual inflatable ones.

The advantages offered by the invention are: the substitution of the traditional life jacket with an article of clothing like a normal jacket, windcheater, bathing costume, uniform or other, soft, elastic, flexible and therefore comfortably wearable; reduction of production costs, since it substitutes a normal garment; moderate bulk with respect to normal garments; pleasing to look at in the same way as other articles of clothing; possibility of use for functions complementary to clothing, such as, for example, the case of a jacket with collar equipped to support handicapped persons and in the case of the utensil-holding tray wearable for example by a fisherman in water; capability of keeping a person afloat because of the lightness of the material being worn, the number of layers and the volume of air trapped between them, in relation to its size; possibility of making small mattresses, armbands, belts and life rings to substitute the inflatable ones.

According to a particularly advantageous embodiment of the invention, a buoyant jacket is provided with said semi-finished material.

A substantial portion of a front part of said jacket comprising said semi-finished material: the size of said front part, the number of layers and the thickness of each layer being such as to allow buoyancy of a person wearing the jacket, if necessary in co-operation with the sleeves and the neck; the back part of said jacket being made of a material for wind-jackets so that it does not substantially improve buoyancy.

It is to be understood that the back part of the jacket provides buoyancy at a lower degree than the front part of it. Therefore, said back part may be made of conventional non-buoyant material; nevertheless said back part may also include a semi-finished material according to the invention with a lower number of layers, or thinner layers, than said front part.

In this way, the person wearing the jacket will float into the water with his/her face turned up, i. e. away form the water, while his/her back is dipped into the water; this prevents the person form drowning, also in the event of unconsciousness or injuries.

Furthermore, the neck of the jacket can be made up with said semi-finished material, in order to prevent the head of the person wearing the jacket from being submerged into the water.

For the same purpose, a band of said semi-finished material may be provided across the shoulders of the jacket, in the back part of it.

In a further particularly advantageous embodiment, the front part of the jacket is provided with a pair of opposite lateral recesses, which may be filled with conventional non-buoyant material.

In addition, the jacket is provided with a pair of lumbar bands, spaced apart from each other so that to define an interrupted configuration.

The latter embodiment allows, in particular, a quicker rotation into the water of the person wearing the jacket in order to bring him/her with his/her face turned up.

Some embodiments of the invention are illustrated, by way of example, in the 19 tables of drawings attached, in which:

FIG. 5 is a view, as in FIGS. 1, 3, but relating to a roll of semi-finished composite quilted in tramlines;

Figure 1:
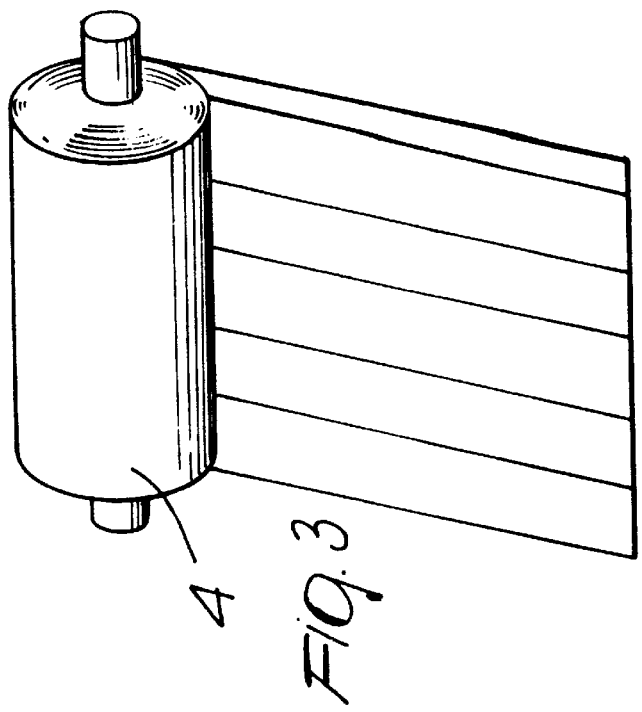
FIG. 1 is the perspective view of a roll of semi-finished composite in layers made up of leaves of expanded polyethylene anchored to a lining of, for example, polyvinylchloride, 1 to 2 mm thick, quilted along curved lines.
Figure 2:
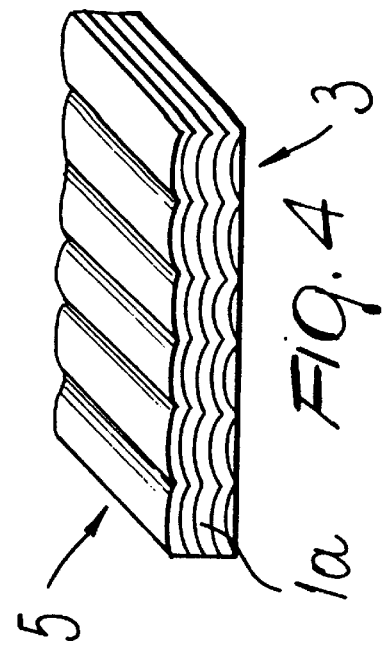
FIG. 2 is a partial, enlarged perspective view of the pack or piece of cloth cut from the roll of FIG. 1 for making the clothing.
Figure 3:
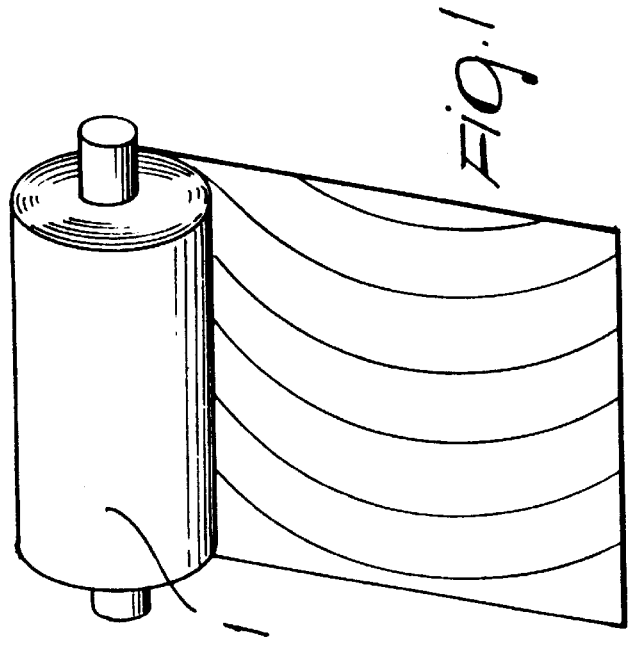
FIG. 3, is, as FIG. 1, the perspective view relating to the semi-finished composite quilted along straight lines.
Figure 4:
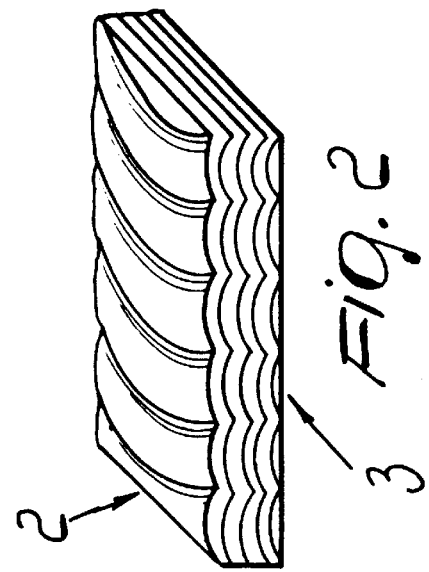
FIG. 4 is, similarly, the enlarged perspective view of the pack of semi finished composite of FIG. 3.
Figure 16:
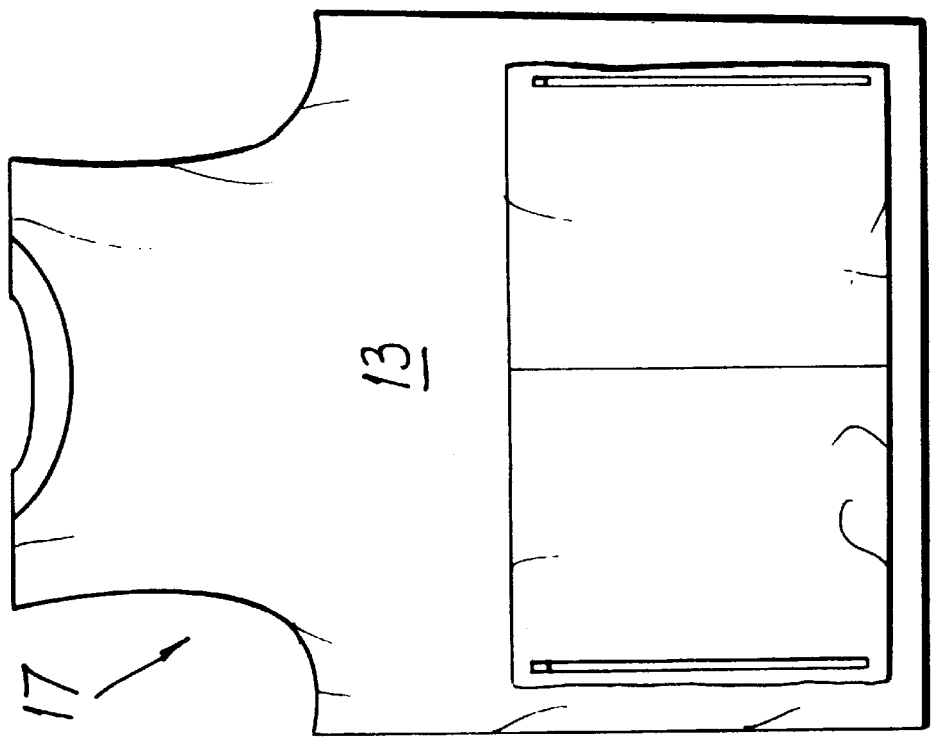
Figure 15:
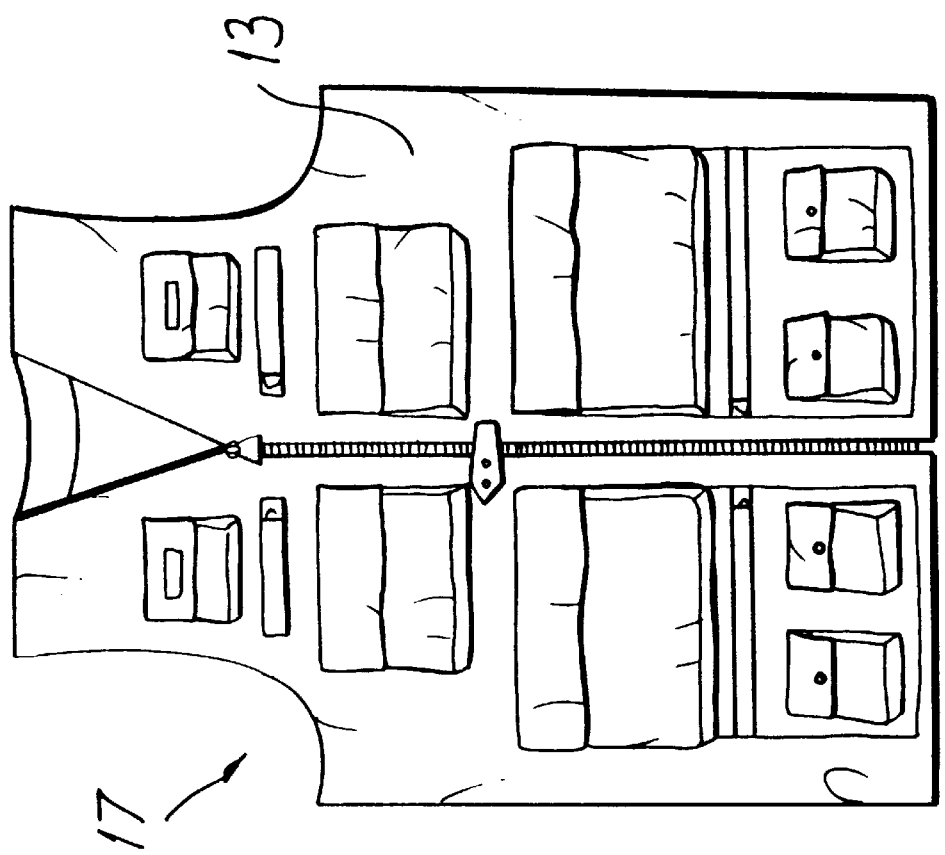
Figure 18:
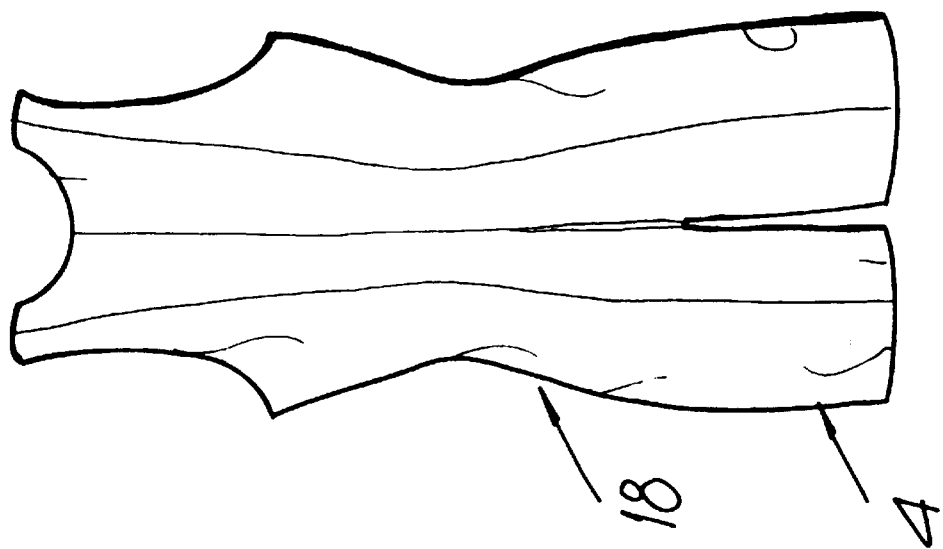
Figure 17:
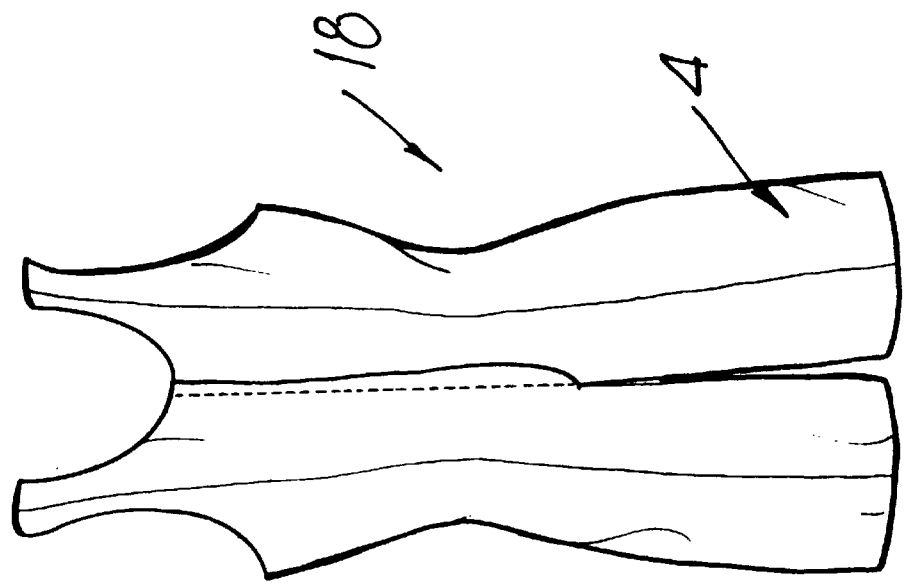
Figure 22:
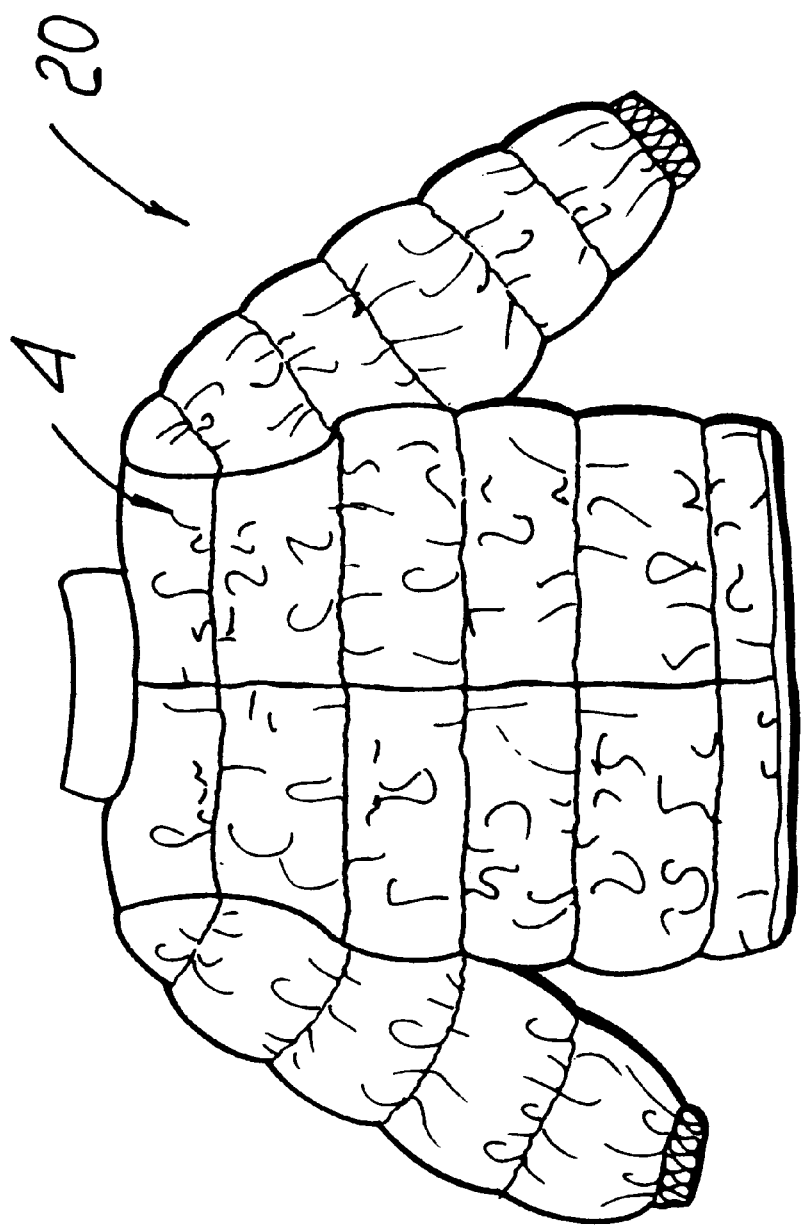
Figure 26:
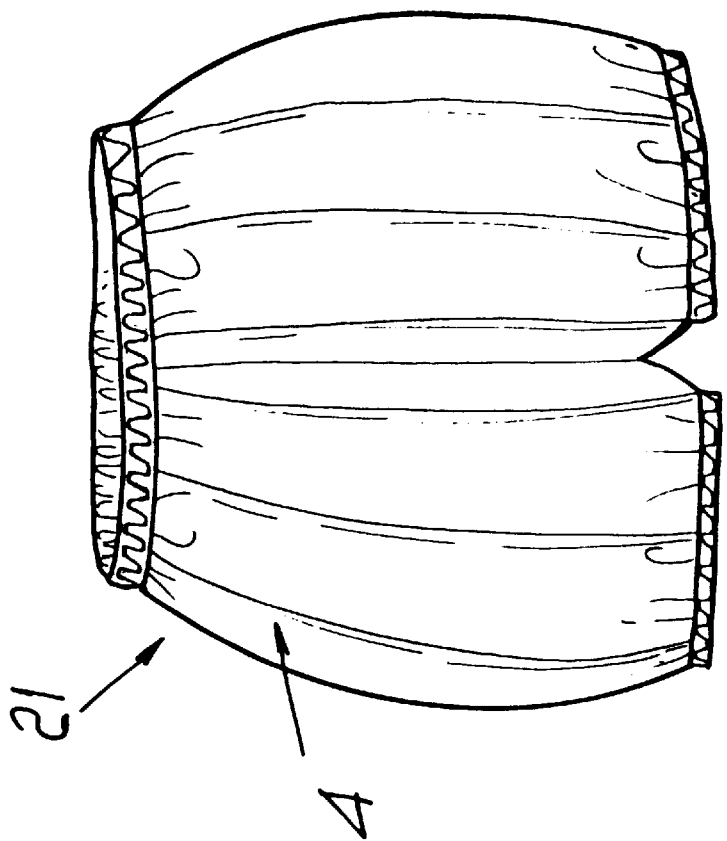
Figure 25:
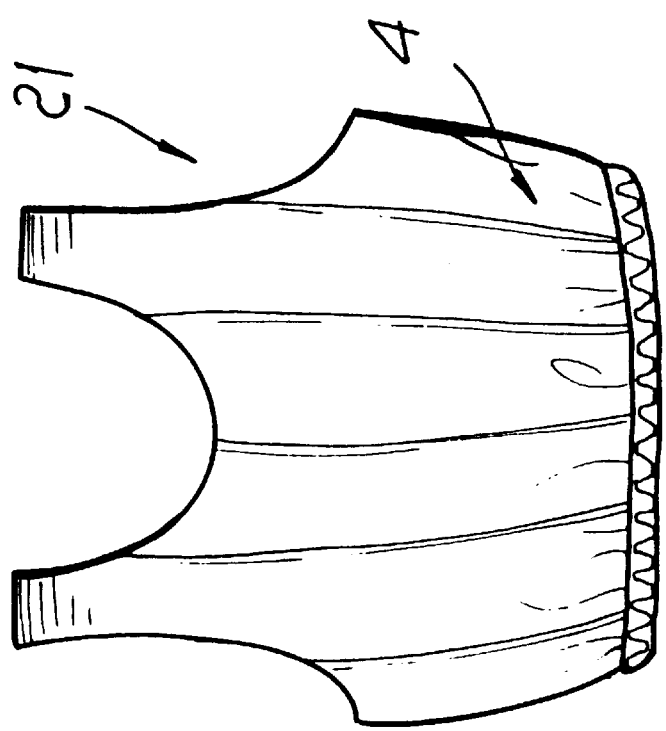
Figure 31:
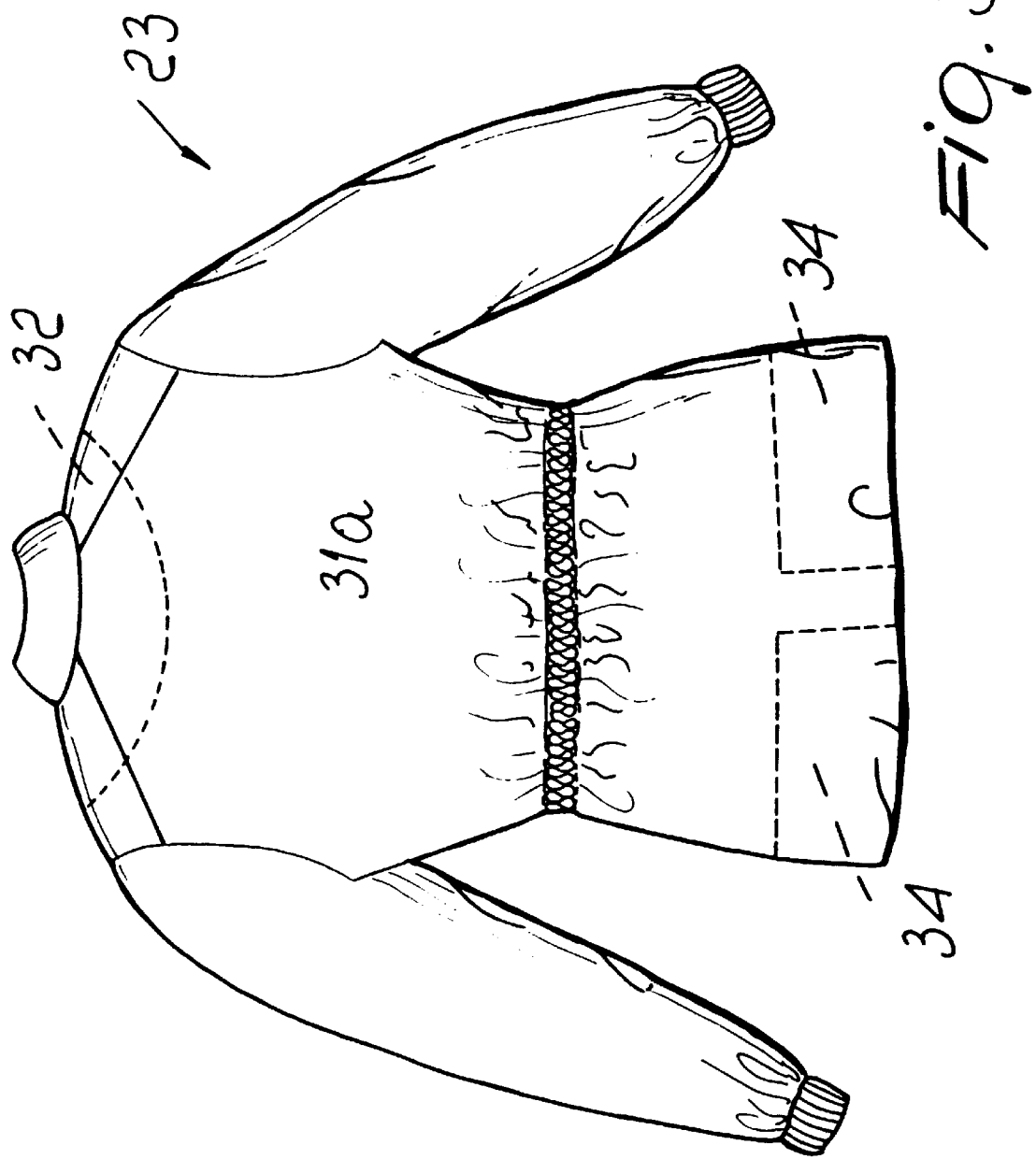
Figure 35:
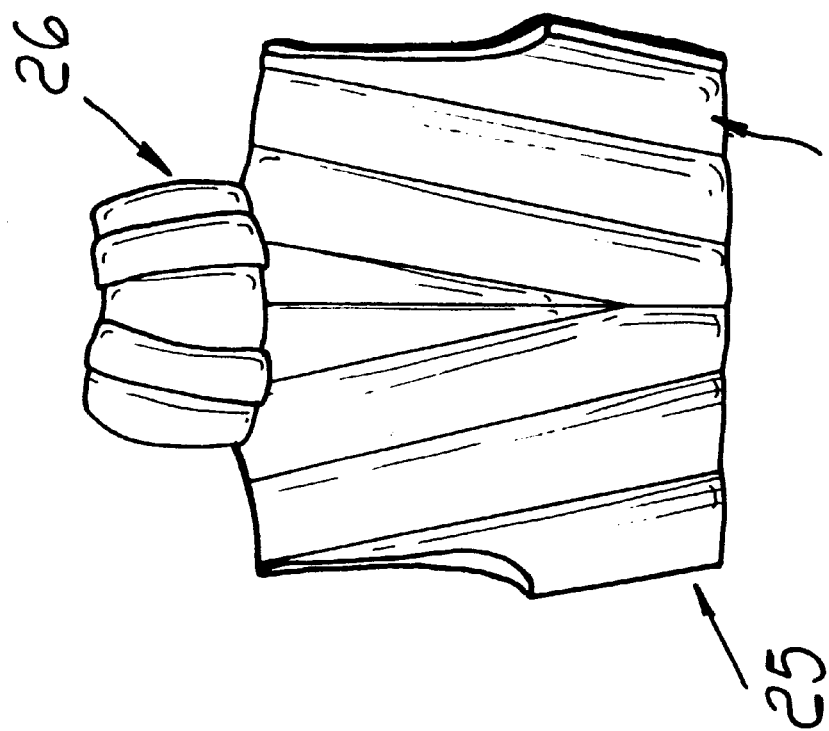
Figure 34:
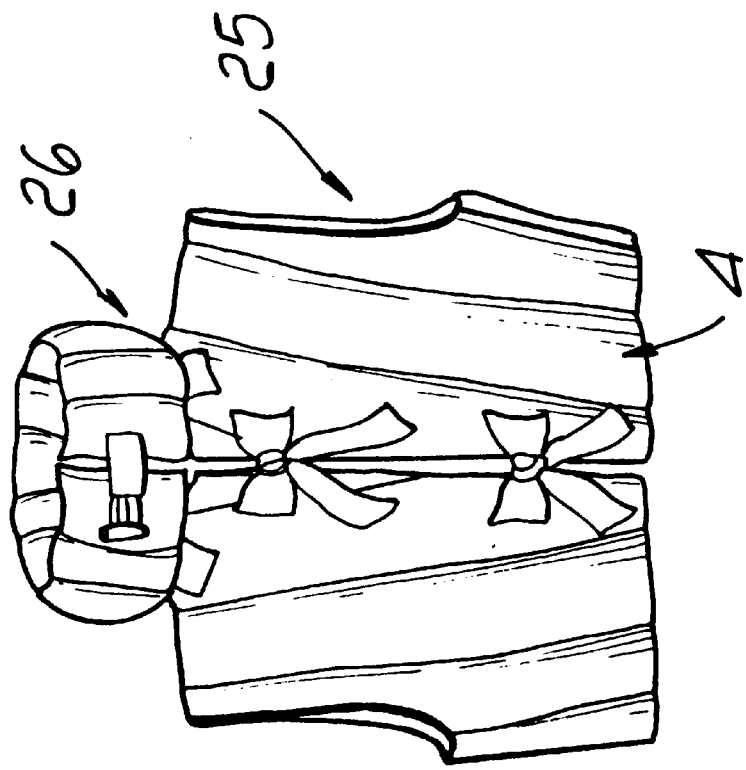

FIG. 6 relates to the pack of semi-finished composite in FIG. 5;

FIG. 7 is, similarly, the perspective view of a roll of semi-finished composite, quilted along undulating lines;

FIG. 8 relates to the pack of semi-finished composite of FIG. 7;

FIG. 9 is, as is FIGS. 1, 3, 5, 7, the perspective view of a roll of semi-finished composite with quilted internal layers, and covered with an unquilted external layer of another material or cloth;

FIG. 10 is a pack or piece of semi-finished composite with only an external lining;

FIGS. 11, 12 refer likewise to a roll and to a pack of semi-finished composite quilted only on the external lining;

FIGS. 13, 14 are respectively the front and rear view of a wind-cheater made out of the semi-finished composite, for example, in expanded polyethylene, with straight line quilting;

FIGS. 15, 16 refer likewise to a utensil-holder vest, for example for technicians made with semi-finished composite as in FIGS. 11, 12;

FIGS. 17, 18 refer likewise to a bathing costume, for example for children and inexpert swimmers, made as above;

FIGS. 19, 20 refer likewise to a bathing costume for adult or child;

FIGS. 21, 22 refer likewise to a wind-cheater for women, made with a semi-finished composite as in FIG. 3, used horizontally;

FIGS. 23, 24, 25, 26 refer likewise to a girl's two piece bathing costume, from front and back;

FIG. 27 is the front view of a sporting jacket made as described in the present invention;

FIG. 28 is the rear view of FIG. 27;

FIG. 29 is the front view of a military jacket as described in the present invention, the eyelets and side of which are illustrated in FIG. 30;

FIG. 31 is the rear view of the jacket in FIG. 29;

FIG. 32 is the same jacket as in FIG. 29 showing the apertures for the water outlet determined by alternate sewing of the lower edge of the flap of the two linings containing padding, enlarged in FIG. 33;

FIGS. 34, 35 are respectively the front and rear view of a jacket with a neck support for the head, for the handicapped, to enable them to remain in the water also on their own, without the risk of the unsupported head going under water;

FIGS. 36, 37 are respectively a view from above and a front view of a belt and utensil carrying apron, for fishermen, particularly fresh water fishermen, made as described in the present invention, for immersion up to the waist;

FIG. 38 is a cross section of a layer of the semi-finished material according to the invention, coated with a sheet of resilient water-proof material;

FIG. 39 is a schematic view of a plurality of layers joined by quilting in the direction of the arrows; the deformation of the layers caused by the quilting has been substantially increased in the direction of the arrows in order to show the formation of the air spaces.

The figures show: 1, the roll of layers 1a of expanded polyethylene quilted with curved lines; 2, a pack or bolt of layers 1a cut from roll 1; 3, a support sheet or cloth lining not necessarily waterproof, quilted to be the internal part of the pack of layers 1a; 4, a roll of layers 1a similar to roll 1, furthermore quilted in straight lines; 5, a pack of layers 1a cut from roll 4; 6, a roll of layers 1a quilted with pairs of lines; 7, a pack of layers 1a made up, for example, of many layers cut from roll 6; 8, another roll of layers, quilted in undulating lines; 9, a pack of layers 1a cut from roll 8; 10, a roll of quilted layers, with an unquilted external lining 11; 12, a pack of quilted layers 1a cut from roll 10; 13, a roll of quilted layers 1a, inserted between two layers of unquilted linings: below, 3, and above, 14, making up a Sack 15 of layers 1a.

It is to be noted that quilting of the layers 1a determines the formation of air spaces 1b (FIG. 39) between adjacent layers in the zones between two consecutive quiltings 1c.

Quilting may preferably be obtained by sewing, or even by glueing or heat sealing.

In FIG. 38 a configuration is shown in which a layer 1a of expanded polyethylene, expanded polyurethane, or expanded PVC is used, affording a plurality of air cells 1d, whose effect is to substantially reduce the specific gravity of the layer. Furthermore, said layer is coated with a sheet 1e of a material selected in the group of unexpanded PVC, cartene, unexpanded polyethylene.

16 shows a wind cheater, for example formed by a pack 5 of layers 1a; 17 shows a utensil carrier vest made up, for example, by pack 13 of layers 1a; 18 shows a bathing costume for child and for inexpert swimmers made up from pack 5; 19 shows a bathing costume for a man, made up by pack 5; 20 shows a wind cheater for a woman, made up from pack 5 however with horizontal quilting; 21 shows a bathing costume for a girl made up from pack 5; 22, a sports jacket made up from pack 5; 23 shows a further jacket, for example for military use, made up from pack 15, or also using a pack consisting of one or more layers made up of leaves of 2-millimeter polyethylene and a layer of cartene a few hundredths of millimeters thick; 24 (FIG. 32), the openings on the lower edge of a garment for example achieved by spaced sewing of the open lower edge of the two pack linings, to allow for the draining of water when it has penetrated the interior of the garment itself.

Jacket 23 has a front part 31 comprising said semi-finished material: the size of said front part, the number of layers and the thickness of each layer being such as to allow buoyancy of a person wearing the jacket 23: also the sleeves and the neck may include said semi-finished material; the back part 31a of said jacket 23 being made of a conventional non-buoyant material for wind-jackets so that it does not substantially improve buoyancy.

A band 32 of said semi-finished material may be provided across the shoulders of the jacket, in the back part of it: said band may have a semi-circular configuration having a height of about 10 to 20 cm, preferably 15 cm.

33 is a pair of opposite lateral recesses, which may be filled with conventional non-buoyant material, said recesses being obtained in the sides of the front part 31 of the jacket.

In addition, the jacket 23 may be provided with a pair of lumbar bands 34, spaced apart from each other so that to define an interrupted configuration and including said semi-finished material.

(FIG. 34) is a jacket for handicapped persons made up of pack 5 of layers 1a, equipped with a stiffened collar 26, openable, this also made from pack 5, in order that a person can float and remain with the head upright out of the water; 27, a belt, to be tightened around the waist with a buckle 28, for example, for fishermen, having on the periphery a kind of thick apron 29 made up of a pack, having also two pairs of braces 30; the said belt and the said apron—quite broad—being made up, for example, the first from pack 9, the second from pack 15; being foreseen that the thickness of the apron, reduced at the position of attachment to the belt to allow for movement up to 90°, is sufficient (even with ten or more centimeters) for the rest of its extension to form a floating ring-like platform on which, with sufficient stability being provided by possible sockets or hooks or other means of attachment not indicated, personal objects and/or useful for fishing could be placed: such a belt and platform being capable, as are all other items of clothing indicated above, of providing the necessary buoyancy to float people even without their help.

In practice, the materials, dimensions and details of execution may be different from but technically equivalent to those described with out departing from the juridical domain of the present invention.

Instead of expanded polyethylene, for example, and of the cartene other materials could be used which are waterproof, of low absolute gravity, soft, flexible, elastic in various degrees.

The buoyancy jacket according to the invention may be provided with a hood, preferably including said composite material.

Furthermore, one or more layers of said composite material may be subjected to anti-UV radiations treatment.

We claim:

1. A semi-finished composite material for the manufacture of buoyancy products, comprising:

a plurality of layers of waterproof material with a specific gravity substantially less than that of water, said layers being elastic and flexible;

fastening means adaptable for associating said layers to each other so as to form a plurality of air filled spaces by consecutive ones of said fastening means between each layer and a respective layer adjacent thereto;

wherein said fastening means consists of a plurality of quiltings spaced from each other so as to form said air filled spaces, said plurality of layers including said air spaces adapted to being further insertable between a lining and a coating;

wherein each layer is coated with a sheet of waterproof, elastic, flexible material of a thickness substantially less than that of the said layer.

2. A semi-finished composite material, according to claim 1, characterized in that the layers of said plurality of layers are connected to each other so as to define air spaces, such as to increase the volume of the material without increasing its weight.

3. A semi-finished composite material, according to claim 1, wherein each layer is made of a material selected from expanded polyethylene, expanded polyurethane, expanded PVC.

4. A semi-finished composite material, according to claim 1, wherein said sheet has a thickness of a few hundredths of a millimeter.

5. A semi-finished composite material, according to claim 4, wherein said sheet is made of a material selected in the group of unexpanded PVC, cartene, unexpanded polyethylene.

6. A semi-finished composite material, according to claim 1, wherein any of said lining and said sheet is made up with textiles.

7. A semi-finished composite material for the manufacture of buoyancy products, comprising:

a plurality of layers of waterproof material with a specific gravity substantially less than that of water, said layers being elastic and flexible;

fastening means adaptable for associating said layers to each other so as to form a plurality of air filled spaces by consecutive ones of said fastening means between each layer and a respective layer adjacent thereto;

wherein said fastening means consists of a plurality of quiltings spaced from each other so as to form said air filled spaces, said plurality of layers including said air spaces adapted to being further insertable between a lining and a coating;

wherein said quiltings extend across a substantial part of the length of said layers.

8. A semi-finished composite material, according to claim 7, wherein the layers are joined by quilting to both said lining and said sheet.

9. A semi-finished composite material, according to claim 7, wherein said quiltings are distributed at a distance of at least 7 cm.

10. Buoyancy jacket comprising a semi-finished composite material, including:

a plurality of layers of waterproof material with a specific gravity substantially less than that of water, said layers being elastic and flexible;

fastening means adaptable for associating said layers to each other so as to form a plurality of air filled spaces by consecutive ones of said fastening means between each layer and a respective layer adjacent thereto;

wherein said fastening means consists of a plurality of quiltings spaced from each other so as to form said air filled spaces, said plurality of layers including said air spaces adapted to being further insertable between a lining and a coating;

wherein each layer is coated with a sheet of waterproof, elastic, flexible material of a thickness substantially less than that of the said layer.

11. Buoyancy jacket described in claim 10, comprising a back part and a front part thereof, said back part of the jacket providing buoyancy at a lower degree than the front part thereof.

12. Buoyancy jacket according to claim 11, wherein said back part is made using a conventional non-buoyant material.

13. Buoyancy jacket according to claim 11, wherein said back part is made using a semi-finished composite material having a number of layers lower than a number of layers of the composite material used for the front part.

14. Buoyancy jacket according to claim 11, wherein said back part is made using a semi-finished composite material having layers thinner than the layers of the composite material used for the front part thereof.

15. Buoyancy jacket according to claim 11, wherein the front part of the jacket is provided with a pair of opposite lateral recesses.

16. Buoyancy jacket according to claim 11, wherein the back part of the jacket is provided with a pair of lumbar bands of said composite material, said lumbar bands being spaced apart from each other so as to define an interrupted configuration.

17. Buoyancy jacket according to claim 11, wherein the back part of the jacket is provided with a band of said composite material extending across the shoulders.

18. Buoyancy jacket according to claim 17, wherein said band has a height of about 10 to 20 cm.

19. Buoyancy jacket according to claim 18, wherein said band has a semi-circular configuration.

20. Buoyancy jacket according to claim 10, and further comprising a collar, said collar of the jacket being stiffened by using said semi-finished material.

21. Buoyancy jacket according to claim 10, comprising a lining, said lining affording apertures in its lower portions.

22. Buoyancy jacket according to claim 10, comprising a raised removable collar.

23. Buoyancy article of clothing comprising a semi-finished composite material, including:

a plurality of layers of waterproof material with a specific gravity substantially less than that of water, said layers being elastic and flexible;

fastening means adaptable for associating said layers to each other so as to form a plurality of air filled spaces by consecutive ones of said fastening means between each layer and a respective layer adjacent thereto;

wherein said fastening means consists of a plurality of quiltings spaced from each other so as to form said air filled spaces, said plurality of layers including said air spaces adapted to being further insertable between a lining and a coating;

wherein each layer is coated with a sheet of waterproof, elastic, flexible material of a thickness substantially less than that of the said layer.

24. Buoyancy article of clothing according to claim 23, comprising a belt, two pairs of braces, buckles and an apron, said belt being equipped with said pair of braces, said braces being attached by buckles and said belt being connected to said apron, said apron including said composite material.

25. Buoyancy mattress comprising a semi-finished composite material, including:

a plurality of layers of waterproof material with a specific gravity substantially less than that of water, said layers being elastic and flexible;

fastening means adaptable for associating said layers to each other so as to form a plurality of air filled spaces by consecutive ones of said fastening means between each layer and a respective layer adjacent thereto;

wherein said fastening means consists of a plurality of quiltings spaced from each other so as to form said air filled spaces, said plurality of layers including said air spaces adapted to being further insertable between a lining and a coating;

wherein each layer is coated with a sheet of waterproof, elastic, flexible material of a thickness substantially less than that of the said layer.

26. One of an arm band, belt, and buoyancy ring, comprising a semi-finished composite material, including:

a plurality of layers of waterproof material with a specific gravity substantially less than that of water, said layers being elastic and flexible;

fastening means adaptable for associating said layers to each other so as to form a plurality of air filled spaces by consecutive ones of said fastening means between each layer and a respective layer adjacent thereto;

wherein said fastening means consists of a plurality of quiltings spaced from each other so as to form said air filled spaces, said plurality of layers including said air spaces adapted to being further insertable between a lining and a coating;

wherein each layer is coated with a sheet of waterproof, elastic, flexible material of a thickness substantially less than that of the said layer.

* * * * *